(12) United States Patent
Nguyen

(10) Patent No.: US 12,435,804 B2
(45) Date of Patent: Oct. 7, 2025

(54) POP-UP VALVE FOR MANAGING BACKFLOW

(71) Applicant: Axxiom Manufacturing, Inc., Fresno, TX (US)

(72) Inventor: Phuong Taylor Nguyen, Richmond, TX (US)

(73) Assignee: Axxiom Manufacturing, Inc., Fresno, TX (US)

( * ) Notice: Subject to any disclaimer, the term of this patent is extended or adjusted under 35 U.S.C. 154(b) by 47 days.

(21) Appl. No.: 18/600,447

(22) Filed: Mar. 8, 2024

(65) Prior Publication Data

US 2024/0295271 A1    Sep. 5, 2024

Related U.S. Application Data

(63) Continuation-in-part of application No. 15/929,857, filed on May 26, 2020, now abandoned.

(51) Int. Cl.
| | |
|---|---|
| *F16K 15/02* | (2006.01) |
| *F16K 15/06* | (2006.01) |
| *F16K 15/20* | (2006.01) |

(52) U.S. Cl.
CPC .......... *F16K 15/063* (2013.01); *F16K 15/026* (2013.01); *F16K 15/207* (2013.01)

(58) Field of Classification Search
CPC .... F16K 15/063; F16K 15/026; F16K 15/207; Y10T 137/7838
See application file for complete search history.

(56) References Cited

U.S. PATENT DOCUMENTS

| | | | |
|---|---|---|---|
| 2011/0005618 A1* | 1/2011 | Lin ....................... | B05B 1/3006 137/516.25 |
| 2011/0011468 A1* | 1/2011 | Nguyen ................ | F16K 15/044 137/513.7 |
| 2012/0241026 A1* | 9/2012 | Nguyen ............... | H04B 1/7156 137/512 |

* cited by examiner

*Primary Examiner* — P. Macade Nichols
(74) *Attorney, Agent, or Firm* — Kearney, McWilliams & Davis, PLLC; John M. DeBoer

(57) ABSTRACT

A pop-up valve or valve assembly operable to manage backflow, the assembly configured with a stem or stem portion. The assembly includes a valve sleeve disposed on the stem. The valve sleeve is configured to engage the stem. A stem outside diameter is smaller than an inside diameter of the valve sleeve, such that the sleeve is able to move freely on the stem and also provide a restricted passage for airflow.

20 Claims, 7 Drawing Sheets

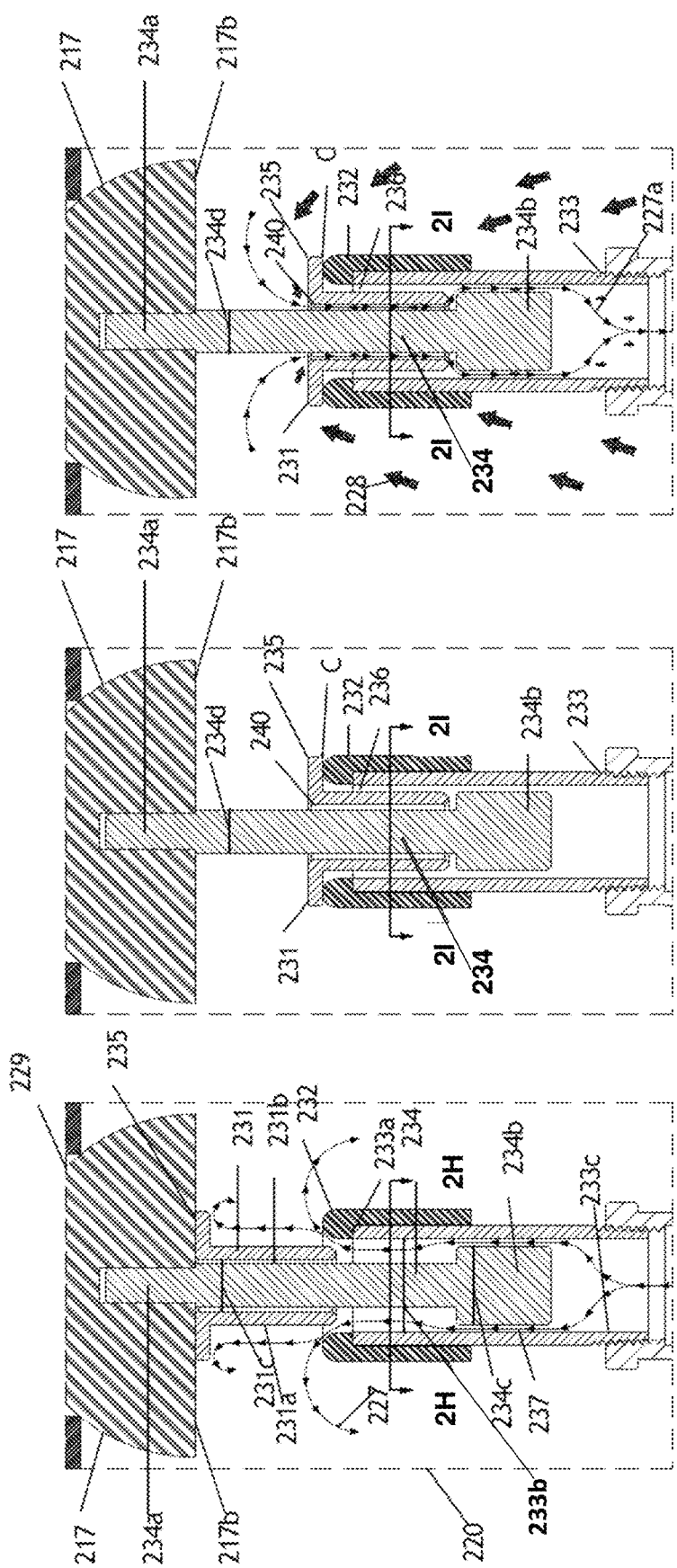

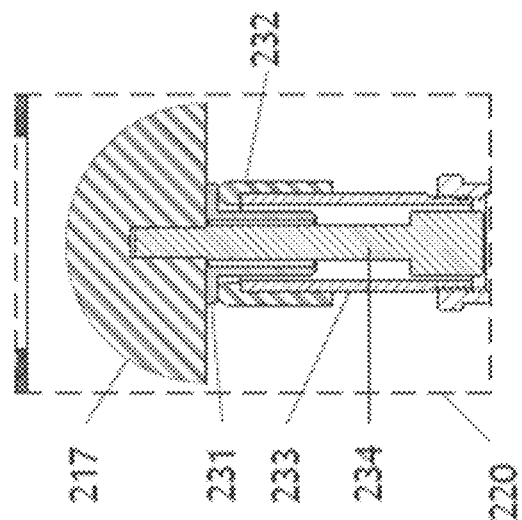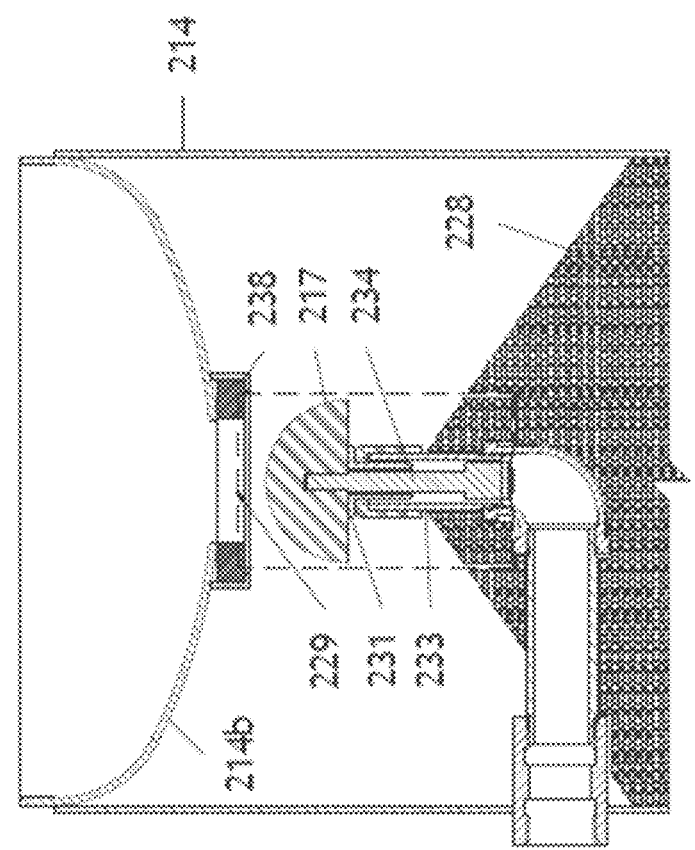

POP-UP VALVE FOR MANAGING BACKFLOW

STATEMENT REGARDING FEDERALLY SPONSORED RESEARCH OR DEVELOPMENT

Not Applicable.

BACKGROUND

Field of the Disclosure

This disclosure generally pertains to abrasive blasting, with related apparatuses, methods, and systems, where the blasting may be wet, dry, or combinations thereof. More specifically, the disclosure relates to improved operation of an abrasive blasting unit or system.

Background of the Disclosure

Abrasive blasting is the process of forcibly propelling a high pressure, high velocity stream of abrasive material against a surface in order to smooth a rough surface, roughen a smooth surface, shape a surface, or remove surface materials, such as contaminants, paint, etc.

FIG. 1 illustrates a typical abrasive blasting process (or system) 100, sometimes referred to as sand-blasting (a form of dry media blasting), has been used for decades to clean or otherwise prepare various types of structural surfaces. In this type of process 100, a supply of abrasive media (sand or other types of particles, such as grit or the like) 114 is mixed with a fast-moving stream of air 112, usually in a mixer or valve 110. The media 114 becomes entrained in the air 112, and the resultant air-abrasive mixture 106 emerges at high speed from a nozzle 105 at the end of a blast hose 104. Abrasive blasting can be used to remove even strongly-adhered compounds (e.g., paint, etc.) from various types of structural surfaces 108.

The discharge of the air-abrasive media mixture 106 is hazardous for multiple reasons. First, particulate from the discharge, and as well as the blasted-surface, will linger in the air in the form of a cloud 107, making breathing difficult. As such, a breathing hood or suit 101 may be worn by an operator 102 (the suit 101 may be fed breathing air 103).

Such process or systems are known, and can include equipment manufactured and sold by Axxiom Manufacturing, Inc., Fresno, Texas, USA. The system may include use of one or more types of valves, such as a "pop-up" valve. A pop-up valve in a pressure inlet pipe permits the system to automatically react to pressure changes by opening and closing the abrasive fill passageway During the start of the blast cycle of a pressure hold system, when the system is pressurized, the pressure in the pot is greater than the blast pressure for a short period of time until the system equalizes. During equalization, air and stray abrasive particles are allowed to back flow into the air pressure control system. This can destroy air pressure control system components. If the air was not allowed to backflow, the pressure equalization would solely occur at the metering valve, pushing air and abrasive through the valve creating significant wear.

Therefore, there is a need to reduce or eliminate the potential backflow of particles into the air pressure control system, during start of each blasting cycle, while still allowing pressure equalization to occur.

SUMMARY

Embodiments of the disclosure pertain to an abrasive blasting system that may include any of: a blast hose; and a deadman assembly coupled directly or indirectly with the blast hose. The blast hose may be coupled with or part of an abrasive blasting unit or skid. There may be an air source for providing a flow of air.

Embodiments of the disclosure pertain to an abrasive blasting system that may include: a blast hose; a mixer or mixer section; and a deadman assembly. The deadman assembly may be operably configured to be in a deadman position of one of: a signal-flow position and a signal-no flow position.

The system may include an air source coupled with the mixer via an air injection conduit in order to provide an air flow to the mixer in response to the deadman position. The air source may be a compressor. The system may include an abrasive source coupled with the mixer via a media conduit in order to provide a media flow in the mixer. The media flow may be in response to the deadman position.

Other embodiments herein pertain to a pressurizable vessel configured with a sealable port that may include a pop-up valve assembly. The pop-up valve assembly may be (proximately) located near the sealable port. The assembly may include: a valve head; and a valve stem coupled with the valve head. The valve stem may have an upper stem portion, a middle stem portion, and a bottom stem portion. There may be valve sleeve movingly disposed around the stem, such as the middle stem portion.

The vessel (or the assembly) may include an open pipe having the bottom stem portion and an at least a portion of the middle stem portion disposed therein. There may be a valve seat disposed on an end of the open pipe.

The middle stem portion may have a middle stem outer diameter. The valve sleeve may have an inner sleeve diameter. In aspects, an upper annulus may be formed as a result of a difference in cross-sectional area of the middle stem outer diameter and the inner sleeve diameter.

The open pipe may have an open pipe inner diameter. The bottom stem portion may have a bottom stem outer diameter. A lower annulus may be formed as a result of a difference in cross-sectional area of the open pipe inner diameter and the bottom stem outer diameter. In aspects, an annulus ratio size of the lower annulus:upper annulus may be in a ratio range of 64:1 to 1.1:1.

Yet other embodiments of the disclosure pertain to a pop-up valve assembly that may include any of: a valve head; and a valve stem coupled with the valve head. The valve stem may have an upper stem portion, a middle stem portion, and a bottom stem portion. The assembly may further include any of: a valve sleeve movingly disposed around the stem; and a valve seat.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 2C shows a close-up side cross-sectional view of the pop-up valve assembly of FIG. 2B according to embodiments of the disclosure;

FIG. 2D shows a close-up side cross-section of the pop-up valve assembly when the blasting system undergoes pressure equalizing, whereby a valve sleeve moves down a stem according to embodiments of the disclosure;

FIG. 2E shows a close-up side cross-section of the pop-up valve assembly with backflow according to embodiments of the disclosure;

FIG. 2F shows a side view of the abrasive blasting system in a non-blasting configuration according to embodiments of the disclosure;

FIG. 2G shows a close-up side cross-sectional view of the pop-up valve assembly in the non-blasting configuration of FIG. 2F according to embodiments of the disclosure;

DETAILED DESCRIPTION

Figure 1:
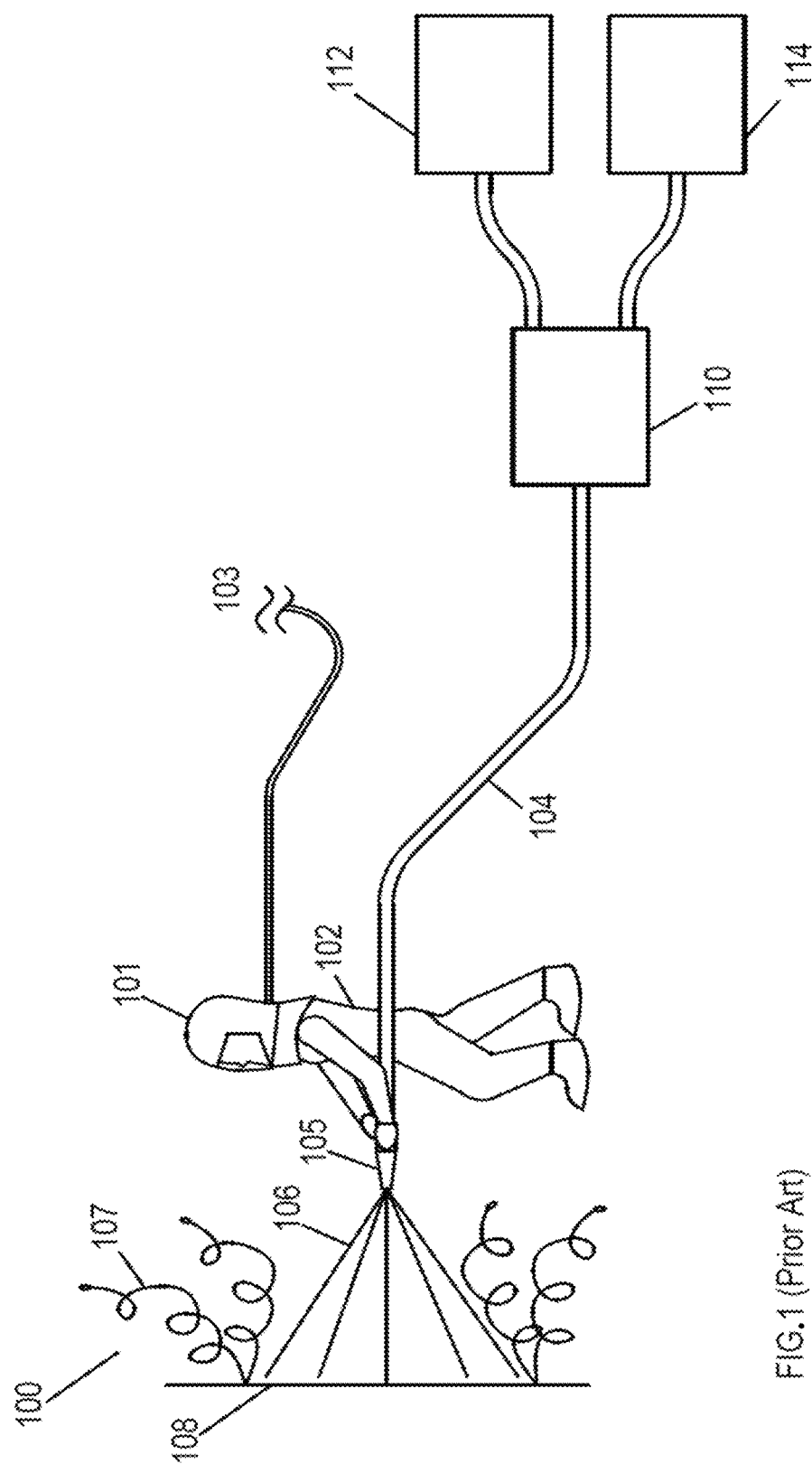
FIG. 1 shows a typical abrasive blasting process according to embodiments of the disclosure.

Regardless of whether presently claimed herein or in another application related to or from this application, herein disclosed are novel apparatuses, units, systems, and methods that pertain to operations such as abrasive blasting, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. Various equipment may be in fluid communication directly or indirectly with other equipment. Fluid communication may occur via one or more transfer lines and respective connectors, couplings, valving, piping, and so forth. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

Without limitation otherwise, the make and manufacture of any particular component, subcomponent, etc., described herein may be as would be apparent to one of skill in the art, such as molding, forming, press extrusion, machining, additive manufacturing, etc. Components, subcomponents, etc. may be metallic, plastic, composite, and so forth, and need not all be of the same material. Embodiments of the disclosure provide for one or more components to be new, used, and/or retrofitted to existing machines and systems.

For any embodiment of the disclosure, associated or auxiliary equipment including automation, controllers, piping, hosing, valves, wiring, nozzles, pumps, gearing, tanks, etc. may be shown only in part, or may not be shown or described, as one of skill in the art would have an understanding of coupling the components for operation thereof. Any component herein that utilizes power or automation may be provided with wiring, tubing, piping, etc. in order to be operable.

Terms

The term "connected" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "pipe", "conduit", "line", "tubular", "hose", or the like as used herein may refer to any fluid transmission means, and may (but need not) be tubular in nature. The term may also apply to other forms of transmission, such as electrical.

The term "composition" or "composition of matter" as used herein may refer to one or more ingredients, components, constituents, etc. that make up a material (or material of construction). Composition may refer to a flow stream of one or more chemical components.

The term "utility fluid" as used herein may refer to a fluid used in connection with the operation of an abrasive blasting device, such as a grit (sand), air, or water. The utility fluid may be for blasting, heating, cooling, or other type of utility. 'Utility fluid' may also be referred to and interchangeable with 'service fluid' or comparable.

The term "mounted" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth.

The term "non-emergency release" as used herein may refer to a voluntary release of a trigger/level mechanism of a deadman assembly in order to accomplish some other task, such as a break for shift change, a meal, or visit to a restroom, or to reposition for blasting a new area.

The term "deadman" as used herein may refer to an operable system or assembly utilizing some form of switch or comparable mechanism that, upon release of the 'deadman', results in shutdown. With respect to a blasting operation, release of the deadman may refer to a shutdown of media transfer through a blast line.

The term "control valve" as used herein may refer to a valve configured to control flow of a fluid, a solid, a slurry, etc. through the valve by varying the size of the flow passage as directed by a signal from a controller. The opening or closing of a control valve may be by electrical, hydraulic, or pneumatic actuators, or the like. The control valve may receive a signal from a deadman assembly in order to control other valves such as metering, combination or air valves.

The term "pneumatic" as used herein may refer to a device or piece of equipment operable or otherwise responsive to some form of air (or other suitable gas) pressure.

The term "metering valve" as used herein may refer to a type of valve associated with a solid, such as sand, grit, and the like. Such a valve may be multi-function. For example, the metering valve may control flow of the solid into a compressed air stream. Another function may be to regulate the solid flow by changing the orifice size in the valve body. The larger the orifice the greater the solids flow. The metering valve may be a media valve.

The term "machined" may refer to a computer numerical control (CNC) process whereby a robot or machinist runs computer-operated equipment to create machine parts, tools and the like.

Figure 2A:
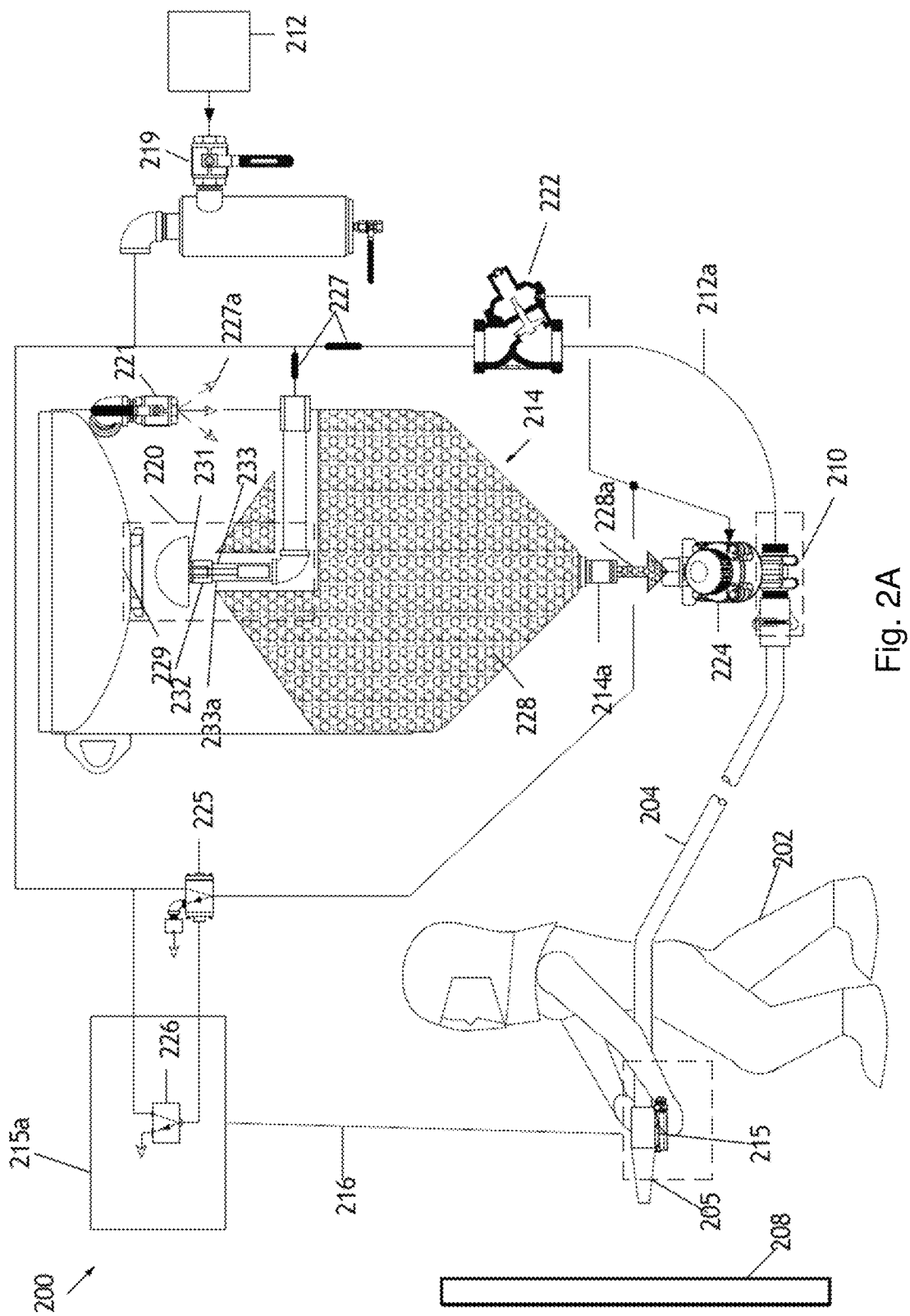
FIG. 2A shows an abrasive blasting system configured with a pop-up valve assembly according to embodiments of the disclosure.

Referring now to FIGS. 2A, 2B, 2C, 2D, 2E, 2F, 2G, 2H, and 2I, an abrasive blasting system configured with a pop-up valve assembly, the abrasive blasting system in a pressurized blasting configuration, a close-up side cross-sectional view of the pop-up valve assembly, a close-up side cross-section of the pop-up valve assembly when the blasting system undergoes pressure equalizing, a close-up side cross-section of the pop-up valve assembly with backflow, a side view of the abrasive blasting system in a non-blasting configuration, a close-up side cross-sectional view of the pop-up valve assembly in the non-blasting configuration, a lateral cross-sectional downward view of the pop-up valve assembly, and another lateral cross-sectional downward view of the pop-up valve assembly of FIG. 2D according to embodiments of the disclosure, respectively, illustrative of embodiments disclosed herein, is shown.

Figure 2B:
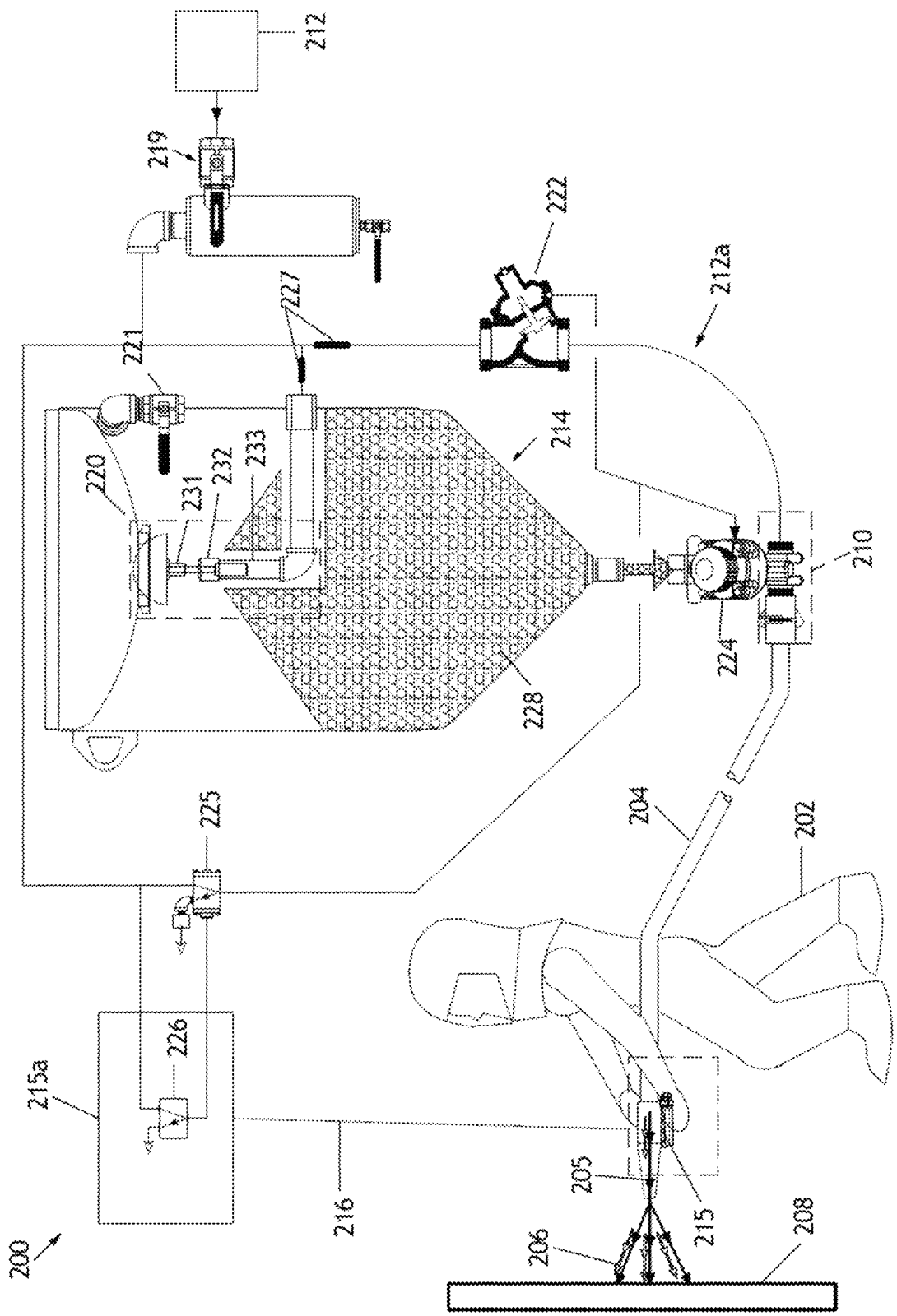
FIG. 2B shows the abrasive blasting system of FIG. 2A in a pressurized blasting configuration according to embodiments of the disclosure.

FIGS. 2A and 2B show a simplified 'box' diagram that illustrates an abrasive blasting system 200 for use in treating a surface 208. One of skill would appreciate the basic nature of FIGS. 2A and 2B do not show detail of valving, fittings, conduits, pumps, controls, etc. that might otherwise be present or necessary.

The system 200 may be configured to be electrical, pneumatic, hydraulic, or as otherwise desired. Whatever the operation needed, an operator 202 may interface with a control panel or other suitable interface. For example, the system 200 may have respective gauges or readouts (e.g., air/water differential gauge) operable to provide various system indications, such as pressure or flow rate. The control panel may also have dials, knobs, etc. (e.g., mode selector—not shown here) for the operator 202 to adjust or change flow rates, pressures, modes, etc.

The system 200 may be operable to provide a single medium or mixture of any of air, water, and/or abrasive. As such, depending on the mode selected, a blast stream 206 out of a (blast) nozzle 205 may be air, water, abrasive, or combinations thereof. While air and water or common, other gaseous or liquidous mediums are within the scope of the disclosure. Air may be used in wet blasting or dry blasting.

In embodiments, the blast stream 206 may include wet abrasive and compressed air that may be discharged from the blast nozzle 205 coupled at an end of a blast hose 204. The blast hose 204 may have its other end configured to engage a respective coupler (e.g., flange) of a mixer or mixer section 210. The resultant blast stream 206 may be directed toward the target surface 208.

The mixer 210 may be passive in that a single material may pass therethrough (such as blowdown air). On the other hand, the mixer 210 may be contemplated as a focal point for the convergence of two or more of the air/water/abrasive mediums coming together for mixing. Just the same, the mixer 210 may also be contemplated as a mixing section having a first mixing portion and a second mixing portion. The first mixing portion may be where air 227 and abrasive 228 mix together, which may then pass into the second mixing portion to mix with water. The 'portions' may be conduits, piping, valves, etc.

Pressurized air 227 may flow into and through the first mixing portion picking up any released abrasive 228a, exiting as an air/abrasive mix. This mix may then flow into and through the second mixing portion. Air 227 may be pressurized, such as via a compressor (not shown) and provided to the mixer 210 from an air source 212 via an auto air valve 222.

Operation of any mode of the system 200 may commence when the deadman assembly 215 is engaged, with a particular mode being selected from the mode selector. The deadman assembly 215 (or respective wiring, tubing, twin-line, networking, etc. 216) may be coupled (directly or indirectly) with the control panel or the like. Operation of the system 200 may stop when the deadman assembly 215 is disengaged.

FIGS. 2A-2I together, show the blasting system 200, which may be multifunctional or multi-mode. For example, there may be a first mode of just blast air, while another mode may be abrasive. The blasting system 200 may be in a no-blast or shutdown mode or configuration, which normally entails the operator 202 releasing (or otherwise not squeezing/engaging) a deadman assembly 215. Without any limitation, the deadman assembly 215 may be pneumatic, electrical, or the like, but may otherwise be associated with deadman logic 215a interrelated to other parts of the system 200 via deadman networking 216.

The deadman assembly 215 may be suited for applications that permit a blast hose 204 (or an area proximate thereto) to be held by an operator 202 facing forward during operation. When the deadman 215 is in an unengaged (or unsqueezed, etc.) or released position, this may correspond to a signal no-flow position. FIG. 2A shows an off or non-blasting configuration, where a pressurizable vessel (such as a media storage device) 214 may be depressurized, pressure equalized, vented, etc.

FIG. 2B shows once a blasting operation begins, the vessel 214 may be pressurized. Signal transmission through network 216 via engagement (squeezing) of the deadman 215 (such as via a trigger or lever, with deadman signal device 226 shown exaggerated) may be transferred to one or more valves or other devices of the system 200.

Air source 212 may be in fluid communication with multiple flow paths. For example, source 212 may provide control air to control devices of the system 200, such as one or more control valves (not shown here). When the deadman 215 is engaged, a control device(s) may be activated via a signal (e.g., pneumatic, electrical, etc.), and then the device may signal other valves or devices to an active position; when the deadman 215 is disengaged, the signal may stop, and the other valves or devices may be deactivated.

The air source 212 may also provide blast or mixing air (flow) 227 to a mixer (mixer section, chamber, conduit, nozzle, etc.) 210 via air injection conduit 212a. In a similar manner, once an activation signal is received from the deadman 215, an abrasive media may transfer from the media storage device 214 through a media transfer conduit 214a into the mixer 210. As mentioned, the pressurizable vessel 214 may be a media storage device, for example, a blast pot, and for ease may be referred to interchangeably.

Abrasive blast media 228 may be provided into the blast media source 214 (which may be a blast pot). In operation, the media source 214 may be pressurized (such as with compressed air), which may facilitate transfer of the media 228/228a through media conduit 214a and a media valve 224. The media valve 224 may accommodate mixing of the abrasive media 228/228a and the air upstream of (optional) water injection. In aspects, the first mixing portion may include the media valve 224.

Upon mixing, the resultant blast or mix media 206 may discharge from the nozzle 205 and impact against the surface 208 to accomplish the desired blasting outcome. The hose 204 may have its other end configured with a hose mating feature or coupler configured to engage a respective coupler (e.g., flange) of the mixer 210 (not shown in detail here).

The blast stream 206 out of the nozzle 205 may be used for removing rust, paint, or other unwanted surface defects. Air flow 227 may be pressurized, such as via a compressor (not shown). Water flow may also be pressurized, such as via a water pump (not shown here), and provided to the mixer 210 from a water source. The water source may be a tank, which may be filled in batch or continuously from an off-skid feed. Water may be selectively fed to the mixer, depending on the desired mode of operation.

Abrasive blast media 228 may be provided into the media storage device 214. The device 214 may be configured with a removable top or other opening through which media 228 may be loaded thereinto. In aspects, the device 214 may be at atmospheric pressure unless and until closed and sealed. The media store device 214 may be configured with a pop-up valve (or valve assembly) 220 of the present disclosure, which may be used to seal an opening or port 229.

Loading of the device 214 may be, for example, bag loaded, or loaded from a larger storage hopper. In operation, the media device 214 may be pressurized (such as with compressed air from the compressor). The pressure in the media source 214 may be raised until it is approximately equal to the air pressure in the mixer 210 where it connects with a media valve 224, which may facilitate gravity flow (228a) of the media 228.

From the media valve 224, the media 228a may selectively flow or otherwise mix into the air flow 227, and this flow then into mixer 210. At the mixer 210, water may be injected. The resultant mixture (or, could be single medium) may then flow through the hose 204, and then discharge out of the blast nozzle 205 and against a work surface 208. Once the deadman 215 is released, the sequence stops and may begin again upon subsequent (re)engagement.

The (primary) air valve 222 may be configured and operable to control the air supply (and related circuit) of the system, as the valve 222 may be in communication with a compressed, pressurized air source 212. The air source 212 may be operable to provide the system 200 with pressurized (blast) air. A (main) air ball valve 219 may be used to control feed or transfer air to the air valve 222, control valve system (deadman and control valves), and the pop-up valve 220.

As shown in FIG. 2A, the main air valve 219 may be closed, such that the system 200 may be shut down or non-operative regardless of whether there is any media 228 in the media storage 214. Since the vent valve 221 may be open, residual air 227a in the storage device 214 may vent or escape through the valve 221 and the pressure will equalize with the ambient pressure outside the device 214.

The valve assembly 220 may have a valve sleeve 231 configured to move, such as free to move to a respective valve seat 232. As shown here, the valve seat 232 may be disposed at an (upper, open) end 233a of a valve pipe 233. The air valve 222 may be closed, as well as the media valve 224 and the control valve 225. As such, any pressure (e.g., pressurized air) may be released through the vent valve 221, which may be akin to what is commonly called blowdown (i.e., reducing the pressure to ambient level).

Referring briefly to just FIGS. 2C and 2D, these figures show the air flowing during (re)pressurization of the media device 214. The pop-up valve 220 may be moved to an upward or open position (2C) via inlet airflow 227. This may occur by increasing (air) pressure to seal the (open) port 229 in the top of the device 214.

When increasing pressure in the device 214, the valve sleeve 231 may be moved or urged upward toward or against a bottom 217b of a (pop-up) valve head 217. A sleeve outside diameter 231a of valve sleeve 231 may be smaller than a pipe inner diameter 233b of pipe 233. The difference (delta) of diameters 231a, 233b may be such to facilitate or allow air to flow into and around and out of the pipe 233, which may enhance the pressurization operation of the device 214. Yet, at the same time the difference of diameters 231a, 233b may be small or negligible enough, which may mitigate or prevent particle back flow into the air control system.

The assembly 220 may have a valve stem 234 movingly (such as slidingly) disposed within the pipe 233. The valve stem may have a top or upper end 234a, and a bottom or lower end 234b. The lower end 234b may be enlarged as compared to rest of the stem 234. The width or diameter of the lower end 234b may be such that it engages or touches (such as just barely) an inner pipe wall 233c (of pipe 233). The slight amount of engagement between the lower end 234b and the wall 233c may be just that to provide stability for the stem 234, yet also provide a narrow passage or annulus (237; see FIG. 2C for exaggerated view) for air (e.g., 227). The slight size may, on the other hand, be restrictive to any abrasive particle backflow. FIG. 2D shows a sleeve face 235 (of sleeve 231) may engage and press against the valve seat 232 (see contact point C). In this downward or seated position, the valve assembly 220 may be configured with a sealing or occluding (at least a top portion) of an interior passage 236 between the pipe 233 and the sleeve 231. The block of the passage 236 may compel airflow strictly through a restriction annulus 240.

The lower end of the stem 234b may have a lower stem outer diameter 234c (which may be constant). The difference in size between the lower stem outer diameter 234c and the pipe inner diameter 233b may result in the annulus 237. As seen in FIGS. 2B and 2C, the annulus 237 may be sized sufficiently for airflow 227 to adequately pressurize the device 214, and seal the pop-up valve head 217 against the gasket 238.

Figure 2I:
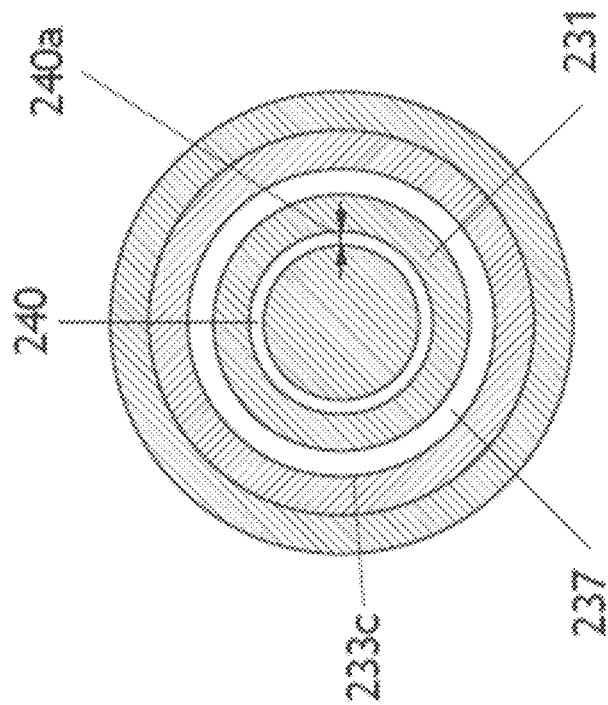
FIG. 2I shows a lateral cross-sectional downward view of the pop-up valve assembly of FIG. 2D according to embodiments of the disclosure.
Figure 2H:
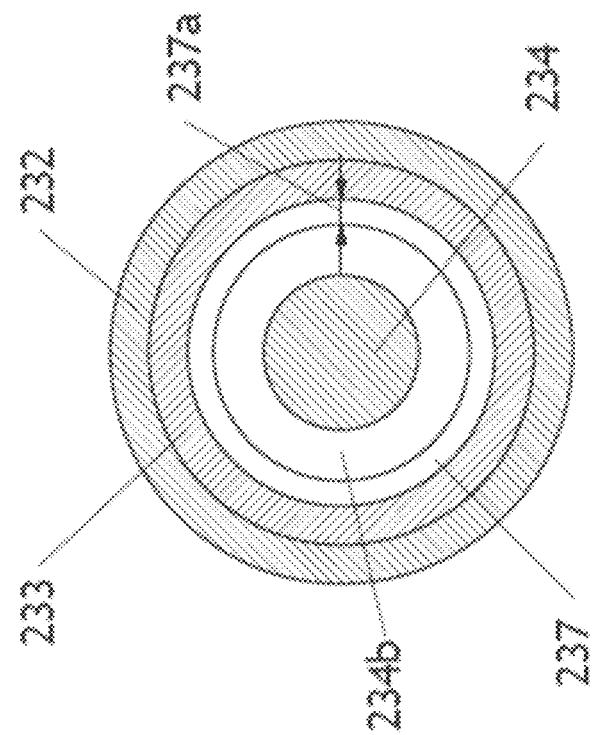
FIG. 2H shows a lateral cross-sectional downward view of the pop-up valve assembly of FIG. 2C according to embodiments of the disclosure.

The stem (or its middle portion) 234 may have a stem outer diameter 234d (which may be constant). The difference in size between the stem outer diameter 234d and a sleeve inner diameter 231c may result in the restriction annulus 240. As seen in FIGS. 2D and 2I, the restriction annulus 240 may be sufficiently sized to allow back airflow or backflow 227a, but at the same time prevent or mitigate undesired flow of media (dust, particles, etc.) 228 thereinto. Essentially the restricting annulus 240 becomes a bottleneck.

The size or scale of the respective annulus 237, 240 is not meant to be limited, and may be on the scale of millimeters to inches. On the other hand, an annulus ratio between the size of the lower annulus 237 and the restriction annulus 240 is of significance. The annulus ratio may be in the range of 64 to 1.1 (i.e., 64:1 to 1.1:1). The size may be in reference to the cross-sectional area of the respective annulus 237, 240. Particle backflow, or the potential of it, may be controlled or mitigated by the difference between the sleeve ID 231c and center stem section OD 234d.

The pathway through the restriction annulus 240 may be flow limiting (bottleneck) because of how the valve sleeve 231 may block or occlude passageway 236 as the sleeve 231 rests on the valve seat 232.

Referring just to 2C-2I together, these views illustrate a seal 238 (for surrounding port or opening 229) may be used to provide a (fluid) tight seal between a top media device pot 214b and the pop-up valve head 217. FIGS. 2F-2G show the valve assembly 220 in its lowest position, with the head 217 moved to its lowest position relative to an open or upper end (2C, 233a) of pipe 233. The upper end 233a of the pipe 233 may be configured with the valve seat 232 therein. The valve sleeve 231 may be disposed between the head 217 and the seat 232. The sleeve 231 may be in contact with each of the head 217 and the seat 232 when the valve assembly 220 is in its fully retracted position (2F). Also as shown, the stem 234 may be retracted into the pipe 233. This lower or retracted position may occur the pressure in the device 214 is equal or comparable to ambient pressure.

FIG. 2C shows the valve assembly 220 of the system 200 may facilitate pressurization of the media device 214, whereby as pressurized air 227 flows into the device 214, the valve head 217 may be urged (sealingly) against the seal (or gasket) (2F, 238). At the same time, air flow 227 may be sufficient enough to move and hold the sleeve 231 against underside or bottom 217b of the valve head 217.

FIG. 2D shows the pop-up valve assembly 220 may have an equalized position, whereby the pressure in the media device 214 has equalized, when then allowed the sleeve 231 to (gravity) drop, then FIG. 2E shows the start of the blast cycle showing the air back flow 227a as the device pressure and the blast pressure equalize. During operation, the pressure hold pressure of the device 214 starts at the supply air pressure. When blast is initiated, the primary air valve 222 may open and the pressure drops in the air supply line 212a below that of the pressure 214, thereby causing backflow through the pipe 233 until the pressure equalizes.

Figure 3:
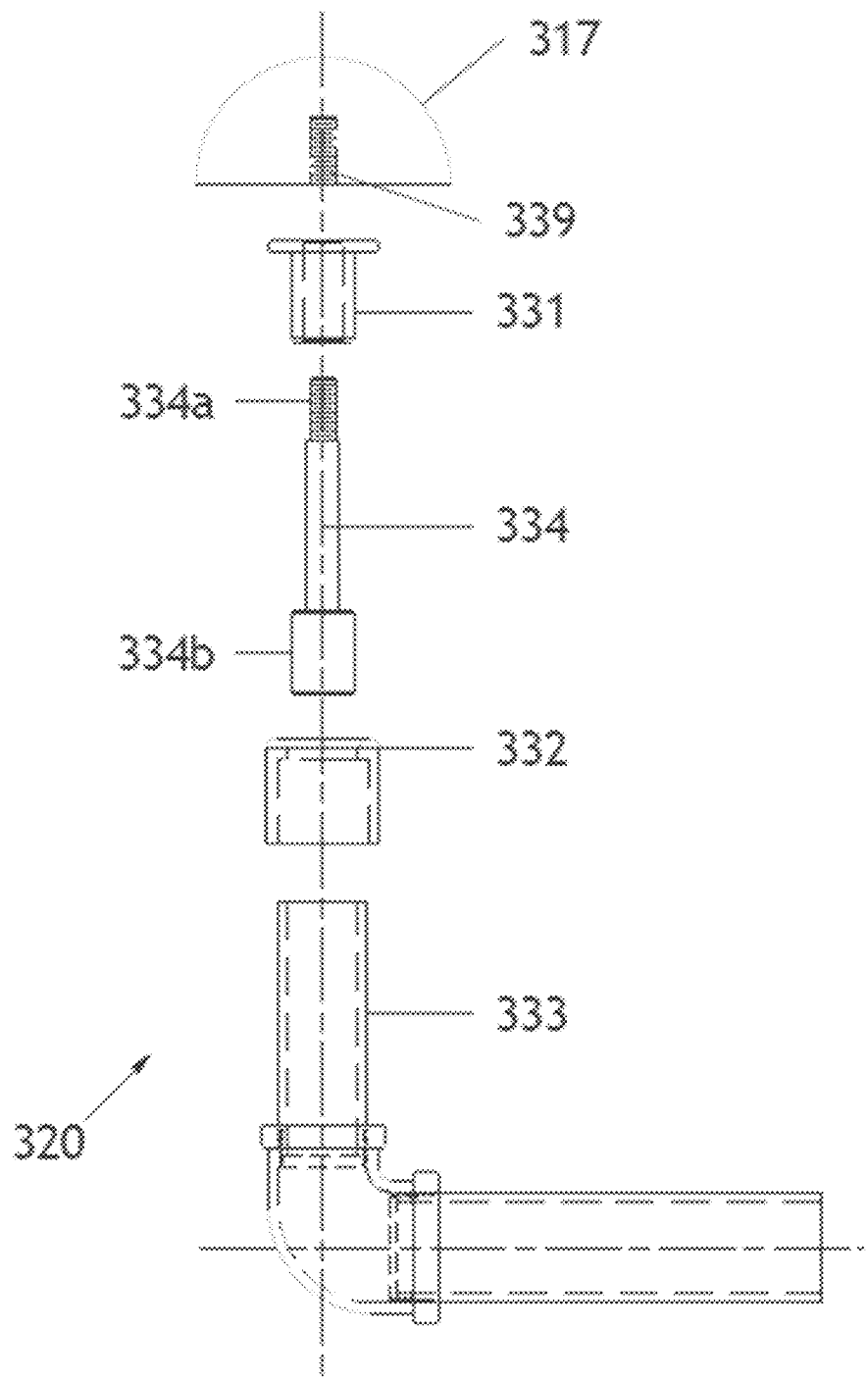
FIG. 3 shows a component breakout view of a pop-up valve assembly according to embodiments of the disclosure.

Referring now to FIG. 3, a component breakout view of a pop-up valve assembly, illustrative of embodiments disclosed herein, is shown.

The valve assembly 320 may be comparable or identical in some aspects, function, operation, components, etc. as that of other system or valve embodiments disclosed herein (e.g., 220, etc.), and analogous reference numbers may be used. Similarities may not be discussed for the sake of brevity, but may otherwise be evident to one of skill.

The pop-up valve assembly 320 may be associated with a pipe 333. The assembly 320 may include a valve seat 332, a valve stem 334, a valve sleeve 331, and a valve head 317. A lower portion or end 334b may have an enlarged base. The enlarged nature of the end 334b may provide or facilitate a minimal pathway for air flow around the stem 334 (and through the pipe 333), as well as popup stabilization and pressurization rate.

This pathway (e.g., 236, FIG. 2C) may be sufficient for air flow but helps restrict any back flow of media (particles, etc.). The stem 334 may have an upper end 334a (which may be threaded). The upper end 334a may be configured to mate with a stem receptacle 339 of the valve head 317.

While preferred embodiments of the disclosure have been shown and described, modifications thereof may be made by one skilled in the art without departing from the spirit and teachings of the disclosure. The embodiments described herein are exemplary only and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A pressurizable vessel configured with a sealable port, the pressurizable vessel comprising:
a pop-up valve assembly proximately located near the sealable port, the pop-up valve assembly comprising:
a valve head;
a valve stem coupled with the valve head, the valve stem further comprising an upper stem portion, a middle stem portion, and a bottom stem portion;
a valve sleeve movingly disposed around the middle stem portion;
an open pipe having the bottom stem portion and an at least a portion of the middle stem portion disposed therein; and
a valve seat disposed on an end of the open pipe.

2. The pressurizable vessel of claim 1, the vessel further comprising an air inlet conduit coupled with the open pipe, the air inlet conduit configured to support the pop-up valve assembly.

3. The pressurizable vessel of claim 1, wherein the middle stem portion has a middle stem outer diameter, wherein the valve sleeve has an inner sleeve diameter, and wherein an upper annulus is formed as a result of a difference in cross-sectional area of the middle stem outer diameter and the inner sleeve diameter.

4. The pressurizable vessel of claim 3, wherein the open pipe has an open pipe inner diameter, wherein the bottom stem portion has a bottom stem outer diameter, and wherein a lower annulus is formed a result of a difference in cross-sectional area of the open pipe inner diameter and the bottom stem outer diameter.

5. The pressurizable vessel of claim 4, wherein an annulus ratio size of the lower annulus:upper annulus is in a ratio range of 64:1 to 1.1:1.

6. The pressurizable vessel of claim 1, wherein the valve stem and the valve head are movable together between a fully retracted position and a sealing position.

7. The pressurizable vessel of claim 6, wherein in the fully retracted position, the valve seat has a contact point with a face of the valve sleeve.

8. The pressurizable vessel of claim 7, wherein the valve sleeve is movable within the open pipe whereby the face is configured to occlude an outer passageway between the open pipe and the valve sleeve.

9. The pressurizable vessel of claim 8, wherein the bottom stem portion has an enlarged shape having a larger outer diameter than a middle stem portion outer diameter.

10. A pressurizable vessel configured with a sealable port, the pressurizable vessel comprising:
a pop-up valve assembly proximately located near the sealable port, the pop-up valve assembly comprising:
a valve head;
a valve stem coupled with the valve head, the valve stem further comprising an upper stem portion, a middle stem portion, and a bottom stem portion;
a valve sleeve movingly disposed around the middle stem portion;
an open pipe having the bottom stem portion and an at least a portion of the middle stem portion disposed therein; and
a valve seat disposed on an end of the open pipe,
wherein the valve stem and the valve head are movable together between a fully retracted position and a sealing position.

11. The pressurizable vessel of claim 10, the vessel further comprising an air inlet conduit coupled with the open pipe, the air inlet conduit configured to support the pop-up valve assembly.

12. The pressurizable vessel of claim 11, wherein the middle stem portion has a middle stem outer diameter, wherein the valve sleeve has an inner sleeve diameter, and wherein an upper annulus is formed as a result of a difference in cross-sectional area of the middle stem outer diameter and the inner sleeve diameter.

13. The pressurizable vessel of claim 12, wherein the open pipe has an open pipe inner diameter, wherein the bottom stem portion has a bottom stem outer diameter, and wherein a lower annulus is formed a result of a difference in cross-sectional area of the open pipe inner diameter and the bottom stem outer diameter.

14. The pressurizable vessel of claim 13, wherein an annulus ratio size of the lower annulus:upper annulus is in a ratio range of 64:1 to 1.1:1.

15. The pressurizable vessel of claim 14, wherein in the fully retracted position, the valve seat has a contact point with a face of the valve sleeve.

16. The pressurizable vessel of claim 15, wherein the valve sleeve is movable within the open pipe whereby the face is configured to occlude an outer passageway between the open pipe and the valve sleeve.

17. A pop-up valve assembly for use in managing backflow of a pressurizable vessel, the pop-up valve assembly comprising:
a valve head;
a valve stem coupled with the valve head, the valve stem further comprising an upper stem portion, a middle stem portion, and a bottom stem portion;
a valve sleeve movingly disposed around the middle stem portion; and
a valve seat,
wherein the valve stem and the valve head are movable together between a retracted position and a sealing position,
wherein in the retracted position, the valve seat has a contact point with a face of the valve sleeve,
wherein the middle stem portion has a middle stem outer diameter,
wherein the valve sleeve has an inner sleeve diameter,
wherein an upper annulus is formed as a result of a difference in cross-sectional area of the middle stem outer diameter and the inner sleeve diameter, and
wherein the bottom stem portion has a bottom stem outer diameter.

18. The pop-up valve assembly of claim 17, wherein the bottom stem outer diameter is larger than the middle stem portion outer diameter.

19. The pop-up valve assembly of claim 18, wherein the valve sleeve is movable in response to a flow of pressurized air.

20. The pop-up valve assembly of claim 18, wherein the valve seat further comprises a top seat end configured with a circumferential face, and wherein at least a portion of the valve sleeve engages the circumferential face in the retracted position.

* * * * *